(12) United States Patent
Pinkerton

(10) Patent No.: US 10,002,139 B2
(45) Date of Patent: Jun. 19, 2018

(54) WORK PACKAGE MANAGEMENT

(71) Applicant: AKTIEBOLAGET SKF, Gothenburg (SE)

(72) Inventor: Alexander Pinkerton, Aberdeen (GB)

(73) Assignee: AKTIEBOLAGET SKF, Gothenburg (SE)

( * ) Notice: Subject to any disclaimer, the term of this patent is extended or adjusted under 35 U.S.C. 154(b) by 431 days.

(21) Appl. No.: 14/693,654

(22) Filed: Apr. 22, 2015

(65) Prior Publication Data

US 2016/0313722 A1 Oct. 27, 2016

(51) Int. Cl.
*G06F 17/30* (2006.01)
*G06Q 10/06* (2012.01)

(52) U.S. Cl.
CPC ... *G06F 17/30241* (2013.01); *G06Q 10/0631* (2013.01)

(58) Field of Classification Search
CPC .............. G06F 17/30241; G06Q 10/0631
See application file for complete search history.

(56) References Cited

U.S. PATENT DOCUMENTS

| | | | | |
|---|---|---|---|---|
| 6,962,531 B2* | 11/2005 | Pace | ................... | G06Q 10/109 463/20 |
| 7,219,834 B2* | 5/2007 | Chang | ................. | G06Q 10/087 235/380 |
| 8,386,342 B2* | 2/2013 | Ferreri | ................. | G06Q 10/087 705/28 |
| 8,576,095 B2* | 11/2013 | Harmon | ................ | G06Q 10/08 340/539.13 |
| 2003/0069716 A1 | 4/2003 | Martinez | | |
| 2003/0069797 A1* | 4/2003 | Harrison | .......... | G06Q 10/06311 705/7.21 |
| 2003/0154253 A1* | 8/2003 | Smith | .................... | H04L 29/06 709/206 |
| 2004/0199413 A1* | 10/2004 | Hauser | ................... | G06Q 10/06 705/304 |
| 2005/0015294 A1* | 1/2005 | Williams | ............... | G06Q 10/04 705/7.29 |
| 2006/0167638 A1 | 7/2006 | Murphy et al. | | |
| 2010/0074416 A1* | 3/2010 | Smith | .................... | H04M 3/229 379/32.04 |
| 2012/0290343 A1* | 11/2012 | Bradley | ............. | G06Q 10/0639 705/7.11 |
| 2014/0136259 A1* | 5/2014 | Kinsey, II | ...... | G06Q 10/063116 705/7.16 |
| 2016/0313722 A1* | 10/2016 | Pinkerton | .......... | G06Q 10/0631 |
| 2016/0314439 A1* | 10/2016 | Pinkerton | .............. | G06Q 10/20 |

* cited by examiner

*Primary Examiner* — Mark Connolly
(74) *Attorney, Agent, or Firm* — Bryan Peckjian; SKF USA Inc. Patent Dept.

(57) ABSTRACT

A work package management system and method for servicing equipment assets for a plurality of clients. The work package management system and method can include one or more work packages that can be accessed by a service agent through an associated data device. The work package management system can be configured to provide work packages that are applicable to the individual service agent. The work package management system can be configured to provide work packages that are based on the location of the data device.

11 Claims, 4 Drawing Sheets

WORK PACKAGE MANAGEMENT

BACKGROUND

A manufacturing plant, chemical plant, or other facility can include various types of equipment, and may include a large number of each equipment type. Maintaining this equipment can require a significant investment in personnel such as service engineers, technicians, or other field service personnel (hereinafter, collectively, "service agents"). Further, maintenance records must be kept to ensure that each equipment asset is maintained on schedule and with proper maintenance procedures. As a result, companies often contract routine equipment maintenance, repair, inspection, and condition monitoring to equipment maintenance providers that specialize in servicing equipment for a large number of clients. Each client can have several different client sites. Further, different facilities for a single client may have different preferred maintenance routines for the same type of equipment.

An equipment maintenance provider (hereinafter, "provider") must ensure that field service personnel such as field agents are provided with correct inspection and maintenance routines (hereinafter, collectively, "maintenance routines") for each particular client, each client site, and each equipment type and model. The provider typically stores and manages a list of all maintenance routines within a central database. A service agent can access the list of maintenance routines from a data device, for example, a handheld data collector (HDC), personal computer, or other data device (hereinafter, collectively, "HDC"), and select the required maintenance routine for the particular client and equipment that is being maintained from the list of all maintenance routines. Once selected, the service agent may provide a manual request to the HDC to download the maintenance routine to the HDC. After the maintenance routine is downloaded, the service agent can review the routine and begin maintenance on the selected equipment. Once the maintenance is completed, the service agent may then manually upload the maintenance results to the central database for review, data analysis, and/or archiving.

An equipment maintenance provider may service equipment for hundreds of clients, each with potentially dozens of client sites and equipment types. Proper maintenance relies on the service agent selecting the service routine that is appropriate for the particular company, client site, and equipment type, which can be a complex task that is prone to error.

A system and process for servicing equipment assets that more accurately provides a service agent with the correct maintenance routine for a selected client, client site, equipment type, and equipment model would be desirable.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A work package management system can include a database, the database including a client list having one or more clients, a list of client sites with one or more client sites for each of the clients, a list of equipment assets including a plurality of serviceable equipment assets, a list of maintenance routines with one or more maintenance routines for each of the serviceable equipment assets, a list of client equipment assets having one or more client equipment assets at each of the client sites for each of the clients, and a list of service personnel with one or more service agents available to perform work on one or more of the equipment assets. The work package management system can further include one or more work packages, wherein each work package includes a client identifier, a client site identifier, and one or more work routes having one or more maintenance routines to be performed on one or more of the equipment assets. Moreover, the work package management system can include an analysis module configured to receive data including a geographic location and to assign at least one of the work packages to at least one of the service agents selected from the list of service personnel at least partly based on the geographic location.

A method for operating a work package management system can include storing information in a database, the database having a client list with one or more clients, a list of client sites with one or more client sites for each of the clients, a list of equipment assets having a plurality of serviceable equipment assets, a list of maintenance routines including one or more maintenance routines for each of the serviceable equipment assets, a list of client equipment assets having one or more client equipment assets at each of the client sites for each of the clients, and a list of service personnel with one or more service agents available to perform work on one or more of the equipment assets. The method for operating a work package management system can further include receiving a request for one or more work packages, wherein each work package has a client identifier, a client site identifier, and one or more work routes including one or more maintenance routines to be performed on one or more of the equipment assets, receiving data into an analysis module, wherein the data includes a geographic location, and assigning at least one of the work packages to at least one of the service agents selected from the list of service personnel at least partly based on the geographic location.

BRIEF DESCRIPTION OF THE DRAWINGS

The accompanying drawings, which are incorporated in, and constitute a part of this specification, illustrate embodiments of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to some embodiments, examples of which are illustrated in the accompanying drawings. Wherever possible, the same reference numbers will be used throughout the drawings to refer to the same or like parts.

As used herein, unless otherwise specified, an "equipment asset" refers to a specific machine that is being maintained or inspected. A "machine asset" is a substructure of an equipment asset, such as a motor, a gearbox, or a pump of an equipment asset. A "maintenance routine" is a series of listed maintenance, inspection, and and/or monitoring steps to perform and complete on an equipment asset. An "inspection" or "task" refers to a particular work activity that is part of a maintenance routine. An inspection or task may consist of a simple acknowledgment from the service agent, such as "valve is isolated," a numerical process or measurement, for example, "2 liters of oil remain in tank", a series of procedural steps for a specific maintenance or inspection task, for example, "next, close valve B," and may include higher level tasks such as the collection of complex machinery vibration signals. A "work route" refers to a maintenance itinerary including multiple maintenance routines across multiple equipment assets that are to be performed in a prescribed order. Although there is no limit to the number of inspections and tasks that can exist within a work route, a work route will typically refer to a specific area within a client's site, for example "fire pump inspection and maintenance." A "work package" refers to a collection of at least some, or all, work routes that a particular service agent will access, in order, to perform scheduled maintenance and inspection activities at a client's site across at least some, or all, areas within the site. Thus, generally, a work package includes a plurality of work routes, each work route includes a plurality of maintenance routines for a plurality of equipment assets, each maintenance routine includes a plurality of inspections or tasks for each equipment asset and, specifically, for each machine asset of each equipment asset.

Figure 1:
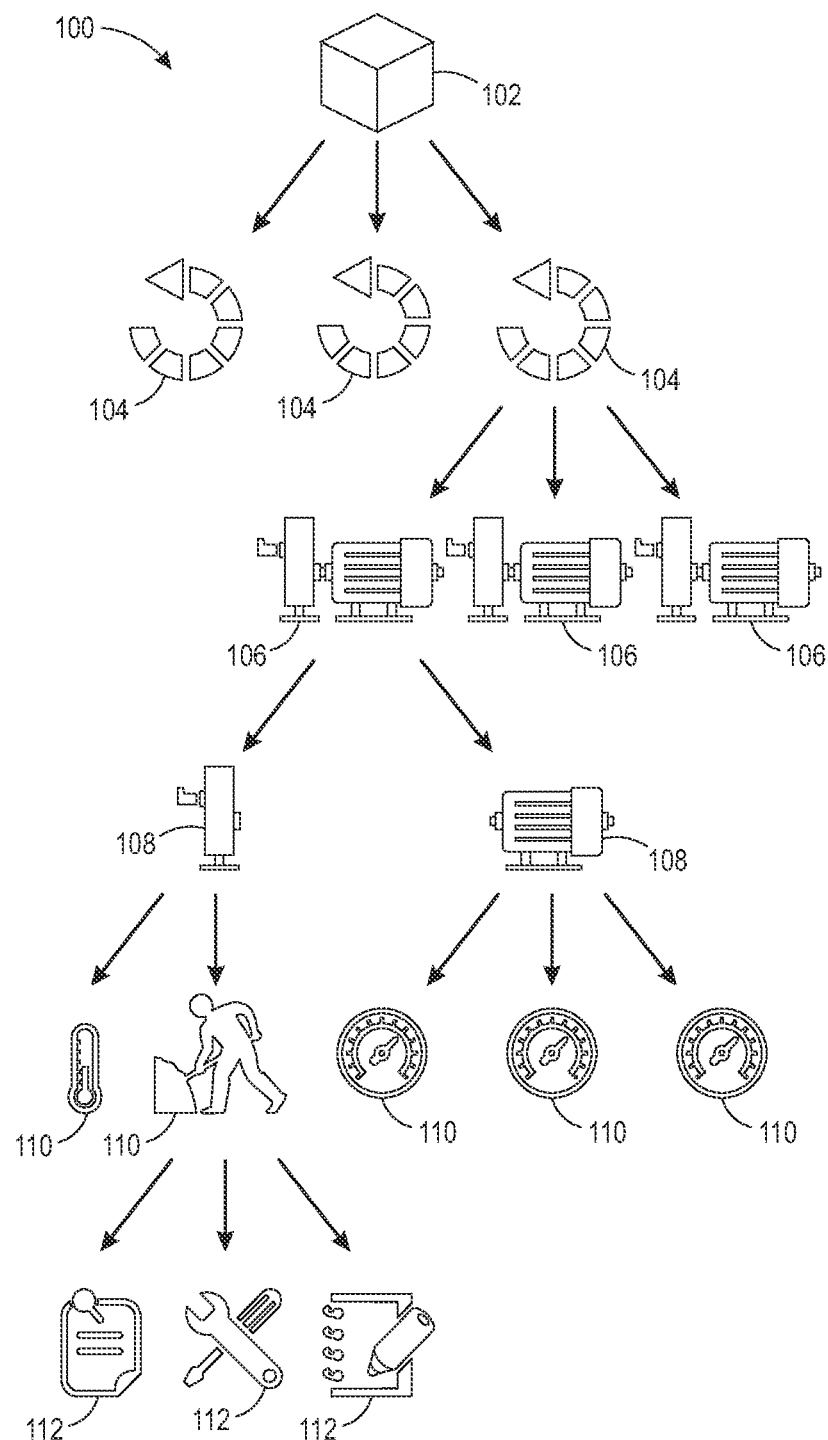
FIG. 1 is a schematic depiction of a work package hierarchy, according to an embodiment.

FIG. 1 is a schematic depiction of one possible work package hierarchy 100. In FIG. 1, a work package 102 includes one or more work routes 104, where each work route specifies the performance of a maintenance routine on one or more equipment assets 106. Each equipment asset 106 has one or more machine assets 108 that may be a subassembly of the equipment asset 106. A work routine, which includes an ordered sequence of inspections, maintenance, and/or tasks 110, is performed on one or more machine assets 108 of each equipment asset 106. The performance of each inspection, maintenance, and/or task 110 can be carried out by a sequence of actions 112 that breaks down the inspection, maintenance, and/or task 110 into a series of actions that are to be performed by the service agent.

As discussed above, an equipment maintenance provider may service equipment for hundreds of clients, each with potentially dozens of client sites and equipment types. A log or record of the maintenance performed and the results of the maintenance must be kept. Proper maintenance relies on the service agent selecting the service routine that is appropriate for the particular company, client site, and equipment type, which can be a complex task that is prone to error.

A system and process as described herein can more accurately provide the correct work package, including the correct maintenance routine and/or work route, to a service agent than conventional techniques. The system and process can reduce or eliminate the manual and complex selection of a required maintenance routine from a long list of routines, and ensures that the required work route and at least some, or all, maintenance routines are downloaded to a service agent's data device such as a handheld data collector (HDC).

Figure 2:
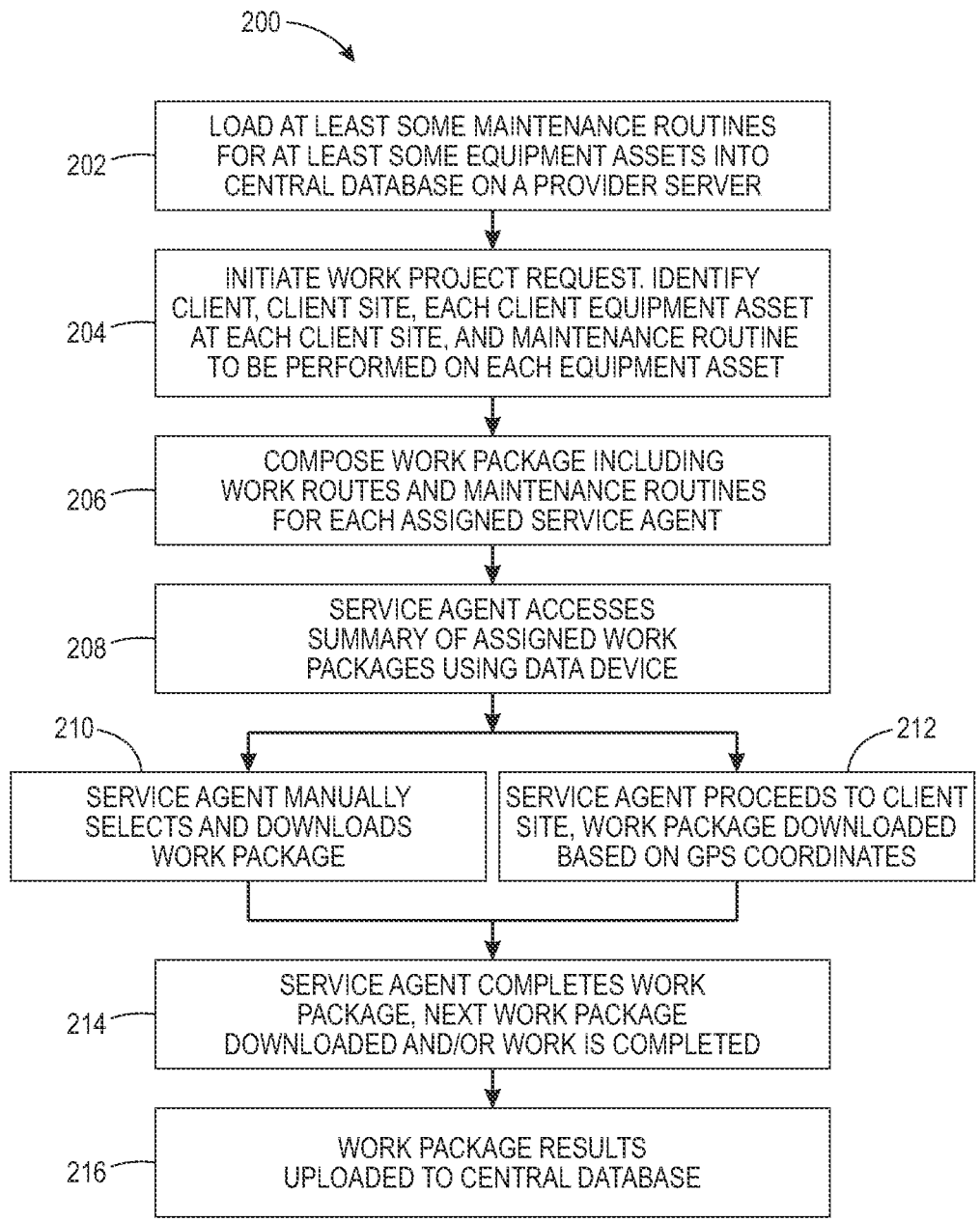
FIG. 2 is a flow chart depicting a process for work package management, according to an embodiment.

FIG. 2 is a flow chart depicting a process for work package management 200 according to an embodiment. The process 200 may include loading at least some maintenance routines for at least some equipment assets into a central database, e.g., located at or otherwise accessible to a provider server, and maintaining the database, as at 202. In an embodiment, a client may access the data on the database relevant to the client's own equipment, and may upload and maintain work packages and/or maintenance routines, and review logged information uploaded by service agents. The database includes a client list including one or more clients, a list of client sites including one or more sites for each client, a list of equipment assets including at least some, or all, serviceable equipment assets, a list of client equipment assets including one or more client equipment asset at each client site, a list of maintenance routines including one or more maintenance routine applicable for each equipment type and, therefore, each equipment asset, and a list of service personnel available to the provider to perform work on the equipment assets.

The list of client sites can include a set of Universal Transverse Mercator (UTM) coordinates for each site, where the UTM coordinates identify the geographic location of the client site. The UTM may include a range of global positioning satellite (GPS) coordinates to cover a geographical area of the specific client site.

The list of equipment assets can include at least some, or all, equipment assets, for example equipment asset types and models, that may be serviced by the provider. The list of equipment assets may further include a list of machine assets for each equipment asset, including the maintenance routine for each equipment asset and each machine asset. The list of client equipment assets includes at least some, or all, serviceable equipment assets for a client, for example, by serial number or media access control (MAC) address. The list of client equipment assets can include a set of UTM coordinates for each client equipment asset, where the UTM coordinates for each client equipment asset identifies the geographic location of each client equipment asset. The list geographic location of each equipment asset can include a set of GPS coordinates for each equipment asset at each client site, which can include a range of coordinates to cover a geographical area of the specific equipment asset. The list of service personnel may include the type of work that each individual service agent is certified or otherwise qualified to perform, such that a particular work package is assigned to only the service personnel certified or qualified to perform the work.

At 204, a work project request is initiated, either specifically by the client or based on an equipment maintenance schedule. The work request may include the client, client site, client equipment asset(s) to be maintained at each client site, and/or the maintenance routine to be performed on each equipment asset.

At 206, the provider or client composes a work package, which is then assigned to a service agent. The work package may include a work package name, a work package description, or another client identifier, that identifies the client, the name of the client site identifier that identifies the client site where the work package is to be performed, and may include the geographical location where the work is to be performed. The geographical location may be identified by a city, a state, or by geographical coordinates. The work package can further include one or more work routes that identify the maintenance routines to be performed on each equipment asset, in chronological order. The work routes can cover any period of time, for example a day or a week. The work package can be uploaded to the provider server, for example by provider personnel or the client, so that the work package is ready for access by the service agent.

At 208, the service agent accesses a summary of assigned work packages using, for example, a data device. In an embodiment, the service agent logs into the provider server, for example using an HDC. A work package management system on the provider server determines whether the connected service agent is part of a group of users who are authorized to receive work package updates. If the service agent is authenticated and an assigned work package is available to the service agent, the work package management system may assign and/or push a list of work package summaries to the service agent's HDC. The list of summaries may include only those work packages that are applicable to the particular service agent for the specific day the list of summaries is accessed. Thus, out of potentially hundreds or thousands of available work packages, only a small number of summaries are displayed to the service agent on the list of summaries. The service agent may manually select and download one or more assigned work packages as shown at 210. In another embodiment as shown at 212, after receiving notification to proceed to a client site, for example by logging into the provider server, the service agent may proceed to the identified client site without manually downloading the work package. Once at the client site, the service agent logs back into the server to access the database, and the HDC transmits current GPS coordinates to the server. Using the transmitted GPS coordinates, the server identifies the appropriate work package for the specific service agent and the received HDC GPS location that identifies the client site where the data device is located, and transmits the appropriate work package for the service agent and GPS coordinates, including one or more work routes and maintenance routines for the client site identified through the HDC GPS coordinates, to the service agent's HDC. In another embodiment, the data device can be configured to download a work package and/or maintenance routine from the work package management system when the data device accesses the database when the data device is within the UTM coordinates for one of the client equipment assets.

Using the work package for the specific client site, the service agent completes the work package as shown at 214. If, after completing the work package, any additional non-completed work packages are available, the service agent may download the additional work package, if not previously downloaded in a batch of two or more work packages, and begins completion of the next work package.

Once one or more work packages are completed, the work package results are uploaded to the central database on the provider server as shown at 216 and logged as part of a maintenance record. The work package results logged as part of the maintenance record may include the maintenance routines performed on each equipment asset including, for example, any replacement parts or supplies used in the and each machine asset. The maintenance record may also include the amount of time required to perform the maintenance. Further, any new equipment or equipment taken out of service, or other equipment-related information, may be indexed and tracked. New equipment may be added to the maintenance schedule and any retired equipment may be removed from the schedule.

It will be appreciated that communications between the data device may be wireless communications, such as through an encrypted or secure wireless link, such as a wireless local area network (WLAN) or public cellular such as 3G, 4G, etc.

Figure 3:
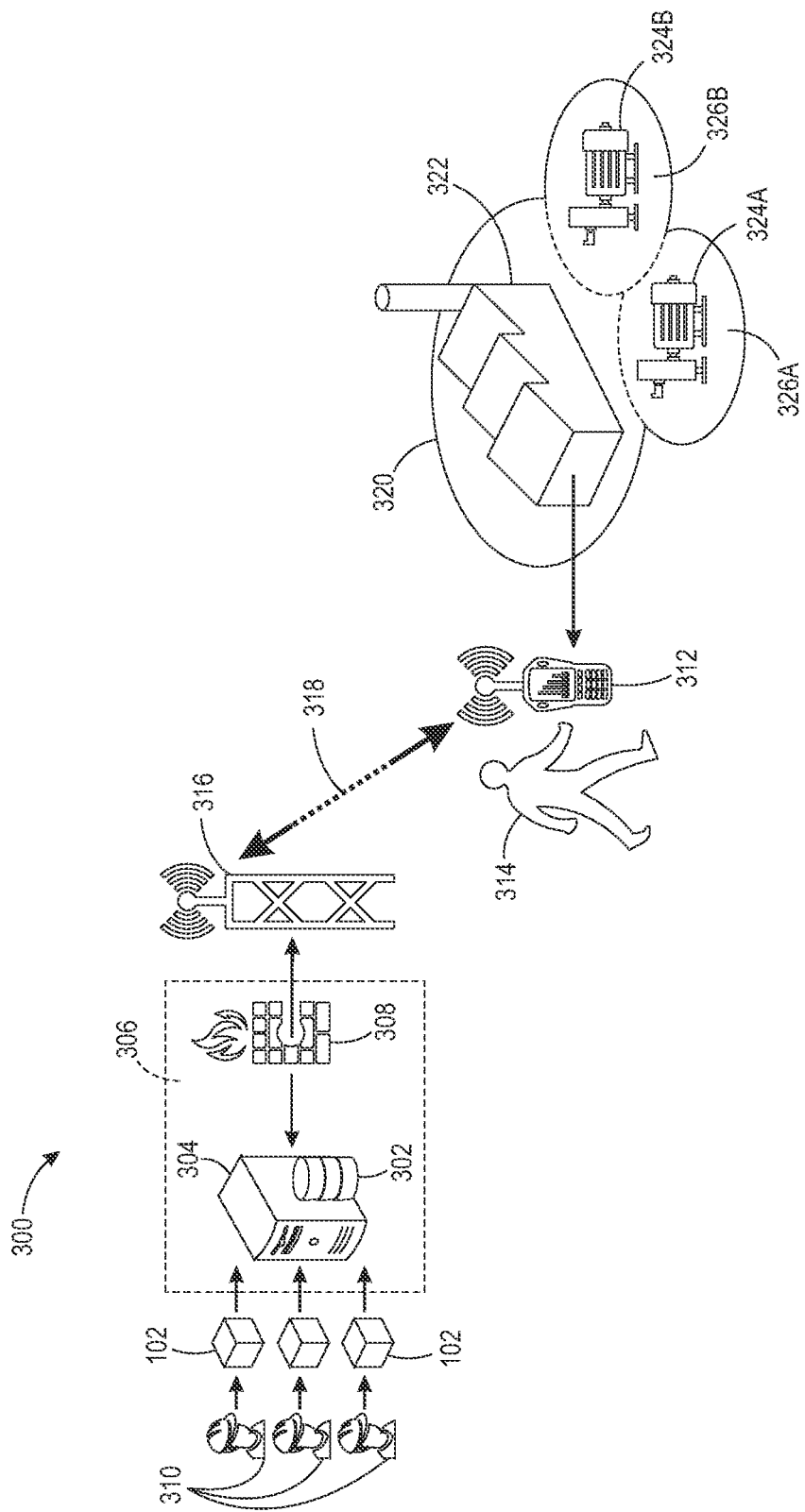
FIG. 3 is a schematic depiction of a work package management system, according to an embodiment.

FIG. 3 is a schematic depiction of a work package management system 300 according to an embodiment. The work package management system 300 can include data and/or digital instructions 302 stored on a non-transitory readable storage medium 304 such as a hardware system, for example within memory on a server such as a provider server. Data may include the database as described above, and the set of digital instructions can include work package management system software. The data and digital instructions 302 and hardware system 304 may together form a computer system 306. The computer system can include other components, such as a security firewall 308 that prevents unauthorized access to data, such as the database 302 stored on the hardware system 304. The computer system 306 may include other hardware, software, and data that is not depicted for simplicity.

The work package management system 300 also includes one or more work package 102. The work package(s) 102 may be compiled or composed either manually or automatically, by the client and/or the provider, and may be initiated by a client request, a provider request, through a maintenance schedule as described above, etc. Each work package 102 can be assigned either manually or automatically to a service agent 310, who will be responsible for performing or executing the work package 102. In an embodiment, assignment to a service agent may be performed at the time the service agent accesses or logs onto the server, based on the GPS location of the service agent that the work package management system uploads (i.e., receives) from one of the data devices at login.

The work package management system 300 can also include a data device 312 such as an HDC, personal computer, tablet, etc. The service agent 314 can log onto the computer system 306 with the data device 312 through a network 316 such as a wireless network or a wired network, for example using security credentials to access the computer system 306 through the firewall 308. The security credentials thus uploads and provides a service agent identifier to the work package management system 300. Data 318 is thus transmitted between the network 316 and the data device 312.

The service agent 314 can download one or more assigned work packages 102 manually across the network 316, where the work package management system transmits the assigned work packages 102 to the data device 312 during the download. In another embodiment, the work management system 300 may use the computer system 306 to push the appropriate work package 102 to the data device 312 as the service agent 314 approaches or enters a set or range of geographic coordinates 320 that is specified for a client site 322 where the assigned work package 102 is to be performed. Additionally, a specific maintenance routine 104 (FIG. 1) for a specific equipment asset 324 may be pushed to the data device 312 as the service agent 314 enters a geographic location or area 324 unique to a set or range of GPS coordinates for an equipment asset 324. In FIG. 3, two equipment assets 324A, 324B, two equipment asset geographic locations 324A, 324B, and one client site 320 that includes the equipment asset geographic locations 324, are depicted.

Thus a work package management system can be configured to present only those work packages to the service agent that are applicable to the immediate timeframe, for example, the current day or week. A work package management system can be configured to push one or more work packages to the service agent based on the geographical location of the service agent, where the geographical location is provided to the work package management system by a data device by uploading GPS coordinates. The geographical location can be associated with a specific client site that includes a plurality of equipment assets, or the geographical location can be associated with the specific equipment asset, depending on the accuracy and/or geographical resolution of the data device.

While FIGS. 1-3 depict an embodiment, it will be understood that other embodiments can include structural components and/or processing stages that are not individually depicted for simplicity, and that existing structural components and/or processing stages can be removed or modified.

Certain embodiments may be performed as a computer program. The computer program may exist in a variety of forms both active and inactive. For example, the computer program can exist as software program(s), which can include program instructions in source code, object code, executable code, or other formats; firmware program(s); or hardware description language (HDL) files. Any of the above can be embodied on a non-transitory computer readable medium, which includes storage devices. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

Figure 4:
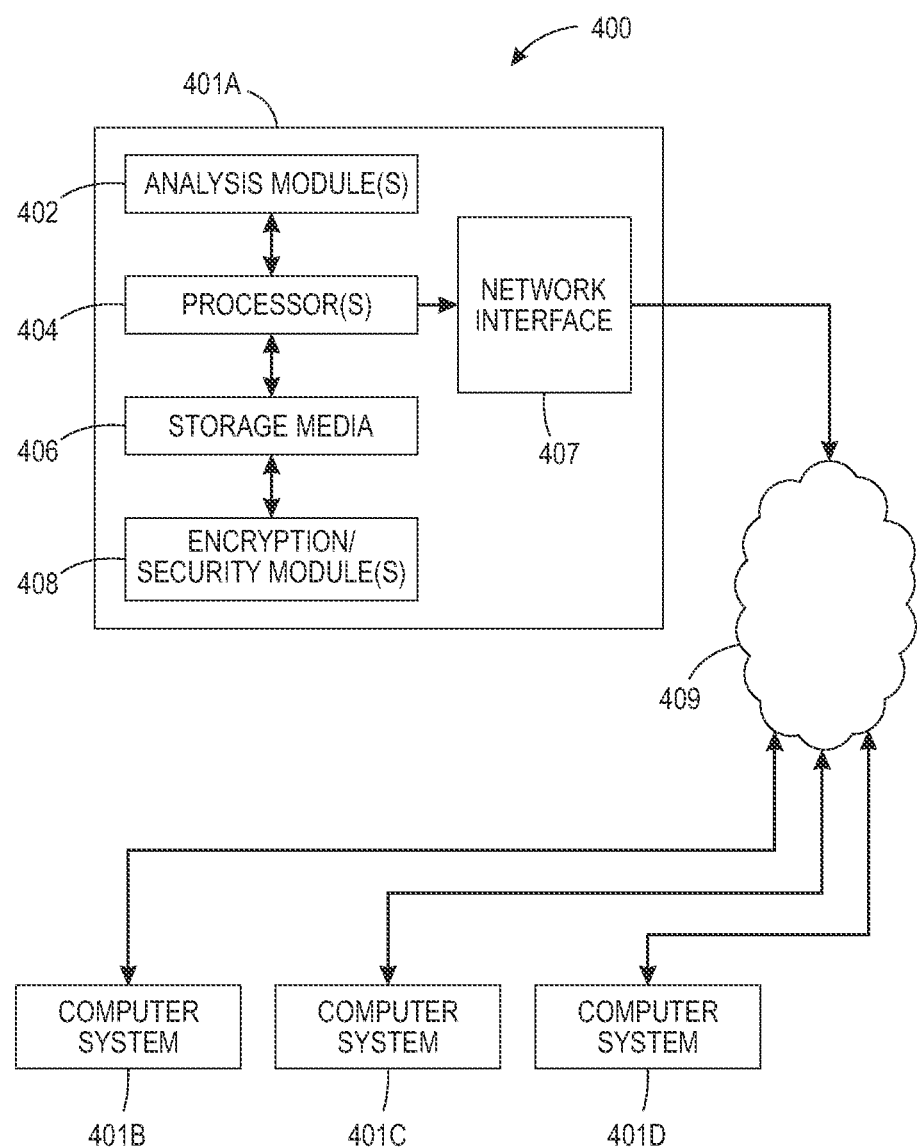
FIG. 4 illustrates a schematic view of a computing system, according to an embodiment.

In some embodiments, the methods of the present disclosure may be executed by a computing system. FIG. 4 illustrates an example of such a computing system 400, in accordance with some embodiments. The computing system 400 may include a computer or computer system 401A. The computer system 401A may be an individual computer system 401A or an arrangement of distributed computer systems. In an embodiment, the computer system 401A may also represent a provider server 304 or a data device 112. The computer system 401A includes one or more analysis modules 402 that are configured to perform various tasks according to some embodiments, such as one or more methods disclosed herein. To perform these various tasks, the analysis module 402 executes independently, or in coordination with, one or more processors 404, which is (or are) connected to one or more storage media 406. The processor(s) 404 is (or are) also connected to a network interface 407 to allow the computer system 401A to communicate over a data network 409 with one or more additional computer systems and/or computing systems, such as 401B, 401C, and/or 401D (note that computer systems 401B, 401C and/or 401D may or may not share the same architecture as computer system 401A, and may be located in different physical locations, e.g., computer systems 401A and 401B may be located in a processing facility, while in communication with one or more computer systems such as 401C and/or 401D that are located in one or more data centers, and/or located in varying countries on different continents).

A processor may include a microprocessor, microcontroller, processor module or subsystem, programmable integrated circuit, programmable gate array, or another control or computing device.

The storage media 406 may be implemented as one or more computer-readable or machine-readable storage media. Note that while in the example embodiment of FIG. 4 storage media 406 is depicted as within computer system 401A, in some embodiments, storage media 406 may be distributed within and/or across multiple internal and/or external enclosures of computing system 401A and/or additional computing systems. Storage media 406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 400 contains one or more security and/or encryption module(s) 408. In the example of computing system 400, computer system 401A includes the security and/or encryption module 408. In some embodiments, a single security and/or encryption module may be used to perform some aspects of one or more embodiments of the methods disclosed herein, for example, to prevent unauthorized access to the server, database, and data, to identify and authenticate service personnel during a login attempt to access the database, to encrypt data during transmission between the provider server and the data devices, etc. In alternate embodiments, a plurality of security and/or encryption module may be used to perform some aspects of methods herein.

It should be appreciated that computing system 400 is merely one example of a computing system, and that computing system 400 may have more or fewer components than shown, may combine additional components not depicted in the example embodiment of FIG. 4, and/or computing system 400 may have a different configuration or arrangement of the components depicted in FIG. 4. The various components shown in FIG. 4 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Geologic interpretations, models, and/or other interpretation aids may be refined in an iterative fashion; this concept is applicable to the methods discussed herein. This may include use of feedback loops executed on an algorithmic basis, such as at a computing device (e.g., computing system 400, FIG. 4), and/or through manual control by a user who may make determinations regarding whether a given step, action, template, model, or set of curves has become sufficiently accurate for the evaluation of the subsurface three-dimensional geologic formation under consideration.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g.—1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

What is claimed is:

1. A method comprising:
    storing information in a database of a computer system that includes one or more processors, the database comprising:
        a client list comprising one or more clients;
        a list of client sites comprising one or more client sites for each of the clients;
        a list of equipment assets comprising a plurality of serviceable equipment assets;
        a list of maintenance routines comprising one or more maintenance routines for each of the serviceable equipment assets;
        a list of client equipment assets comprising one or more client equipment assets at each of the client sites for each of the clients; and
        a list of service personnel comprising one or more service agents available to perform work on one or more of the equipment assets;
    receiving, at the computer system, a request for one or more work packages, wherein each work package comprises a client identifier, a client site identifier, and one or more work routes comprising one or more maintenance routines to be performed on one or more of the equipment assets;
    receiving data into the computer system, wherein the data comprises a geographic location where the requested one or more work packages are to be completed;
    assigning, using the computer system, the requested one or more work packages to at least one of the service agents selected from the list of service personnel at least partly based on the geographic location;
    in response to assigning, transmitting, using the computer system, data representing the requested one or more work packages to one or more computing devices accessible to the at least one of the service agents, wherein the data representing the work package comprises a summary of the work package;
    receiving data representing a geographic location of the at least one service agent from the one or more computing devices accessible to the at least one service agent, after transmitting the data representing the requested one or more work packages to the at least one service agent;

determining that the geographic location of the at least one service agent corresponds to the geographic location where the requested one or more work packages is to be completed; and in response to determining that the geographic location of the at least one service agent corresponds to the geographic location where the requested one or more work packages is to be completed, transmitting additional data representing the requested one or more work packages to the at least one service agent.

2. The method of claim 1, further comprising receiving work package results.

3. The method of claim 1, further comprising storing the database within memory on the computer system.

4. The method of claim 1, wherein the list of the client sites further comprises a geographic location for each of the client sites, and the geographic location received by computing system comprising a geographic location for one of the client sites.

5. The method of claim 1, wherein the list of the client equipment assets further comprises a geographic location for each of the client equipment assets, the geographic location received by the computing system comprising a geographic location for at least one of the client equipment assets.

6. The method of claim 1, wherein the database further comprises a list of machine assets comprising at least one machine asset for each of the equipment assets, wherein each machine asset is a substructure of one of the equipment assets.

7. The method of claim 1, wherein the list of client sites further comprises a set of Universal Transverse Mercator (UTM) coordinates for each of the client sites, wherein the UTM coordinates identify a geographic location of each of the client sites.

8. The method of claim 7, further comprising transmitting the at least one assigned work package at least partly based on the UTM coordinates for one of the client sites.

9. The method of claim 1, wherein the list of client equipment assets further comprises a set of Universal Transverse Mercator (UTM) coordinates for each of the client equipment asset, wherein the UTM coordinates for each of the client equipment asset identify a geographic location of each of the client equipment assets.

10. The method of claim 1, further comprising servicing one or more equipment assets based on the requested one or more work packages, wherein servicing the one or more equipment assets comprises physically adjusting a machine.

11. A method, comprising:
storing information in a database of a computer system that includes one or more processors, the database comprising:
a client list comprising one or more clients;
a list of client sites comprising one or more client sites for each of the clients;
a list of equipment assets comprising a plurality of serviceable equipment assets;
a list of maintenance routines comprising one or more maintenance routines for each of the serviceable equipment assets;
a list of client equipment assets comprising one or more client equipment assets at each of the client sites for each of the clients; and
a list of service personnel comprising one or more service agents available to perform work on one or more of the equipment assets;

receiving, at the computer system, a plurality of requests for work packages from a plurality of clients that are at a plurality of geographical locations, wherein each work package comprises a client identifier, a client site identifier, and one or more maintenance routines to be performed on one or more of the equipment assets;

assigning, using the computer system, the work packages to at least one of the service agents selected from the list of service personnel, wherein assigning comprises:
filtering the plurality of work packages based on the geographical location of the plurality of clients and a geographical location of the at least one service agent, thereby generating a filtered list of one or more work packages available for at least one of the service agents;

in response to receiving the selection, transmitting, using the computer system, data representing the one or more work packages of the filtered list to one or more computing devices accessible to the at least one of the service agents so as to provide access to the filtered list of the one or more work packages to the at least one of the service agents;

receiving a selection of at least one of the one or more work packages of the filtered list from the at least one of the service agent, wherein the data representing the work package comprises a summary of the work package;

receiving data representing a geographic location of the at least one service agent from the one or more computing devices accessible to the at least one service agent, after transmitting the data representing the requested one or more work packages to the at least one service agent;

determining that the geographic location of the at least one service agent corresponds to the geographic location where the requested one or more work packages is to be completed; and in response to determining that the geographic location of the at least one service agent corresponds to the geographic location where the requested one or more work packages is to be completed, transmitting additional data representing the requested one or more work packages to the at least one service agent.

* * * * *